(12) United States Patent
Knudsen et al.

(10) Patent No.: US 8,043,600 B2
(45) Date of Patent: Oct. 25, 2011

(54) HYDROTREATMENT PROCESS

(75) Inventors: Kim Grøn Knudsen, Hellerup (DK); Kim Hedegaard Andersen, Lyngby (DK); Rasmus Breivik, Hillerød (DK); Rasmus Gottschalck Egeberg, Fredensborg (DK); Poul Erik Højlund Nielsen, Fredensborg (DK)

(73) Assignee: Haldor Topsøe A/S, Lyngby (DK)

( * ) Notice: Subject to any disclaimer, the term of this patent is extended or adjusted under 35 U.S.C. 154(b) by 164 days.

(21) Appl. No.: 12/539,491

(22) Filed: Aug. 11, 2009

(65) Prior Publication Data

US 2010/0061927 A1 Mar. 11, 2010

(30) Foreign Application Priority Data

Sep. 10, 2008 (DK) .................................. 2008 01268

(51) Int. Cl.
*C01B 3/24* (2006.01)
*C01B 3/26* (2006.01)
(52) U.S. Cl. ........................................ 423/650; 423/652
(58) Field of Classification Search .................... 423/650
See application file for complete search history.

(56) References Cited

U.S. PATENT DOCUMENTS

| 3,413,214 | A | 11/1968 | Galbreath |
| 3,552,924 | A | 1/1971 | Hepp |
| 3,694,344 | A | 9/1972 | Munro |
| 3,708,569 | A * | 1/1973 | Mounce ..................... 423/574.1 |
| 2002/0004533 | A1 | 1/2002 | Wallace et al. |
| 2003/0221994 | A1* | 12/2003 | Ellis et al. ..................... 208/213 |
| 2006/0186020 | A1 | 8/2006 | Gomes |
| 2008/0161614 | A1* | 7/2008 | Bertoncini et al. ........... 585/240 |

FOREIGN PATENT DOCUMENTS

EP 1911734 A1 4/2008

* cited by examiner

*Primary Examiner* — Melvin Mayes
*Assistant Examiner* — Kenneth Vaden
(74) *Attorney, Agent, or Firm* — Dickstein Shapiro LLP

(57) ABSTRACT

A process for the hydrotreating of fuels with co-production of hydrogen during operation of the process, which enables i.e. reduced need of make-up hydrogen in the hydrotreating stage. The hydrocarbon fuel introduced to the hydrotreatment stage is a fuel containing renewable organic material which generates carbon monoxide during operation of the process. The carbon monoxide is then converted to hydrogen in the recycle loop by a water gas shift stage.

9 Claims, 1 Drawing Sheet

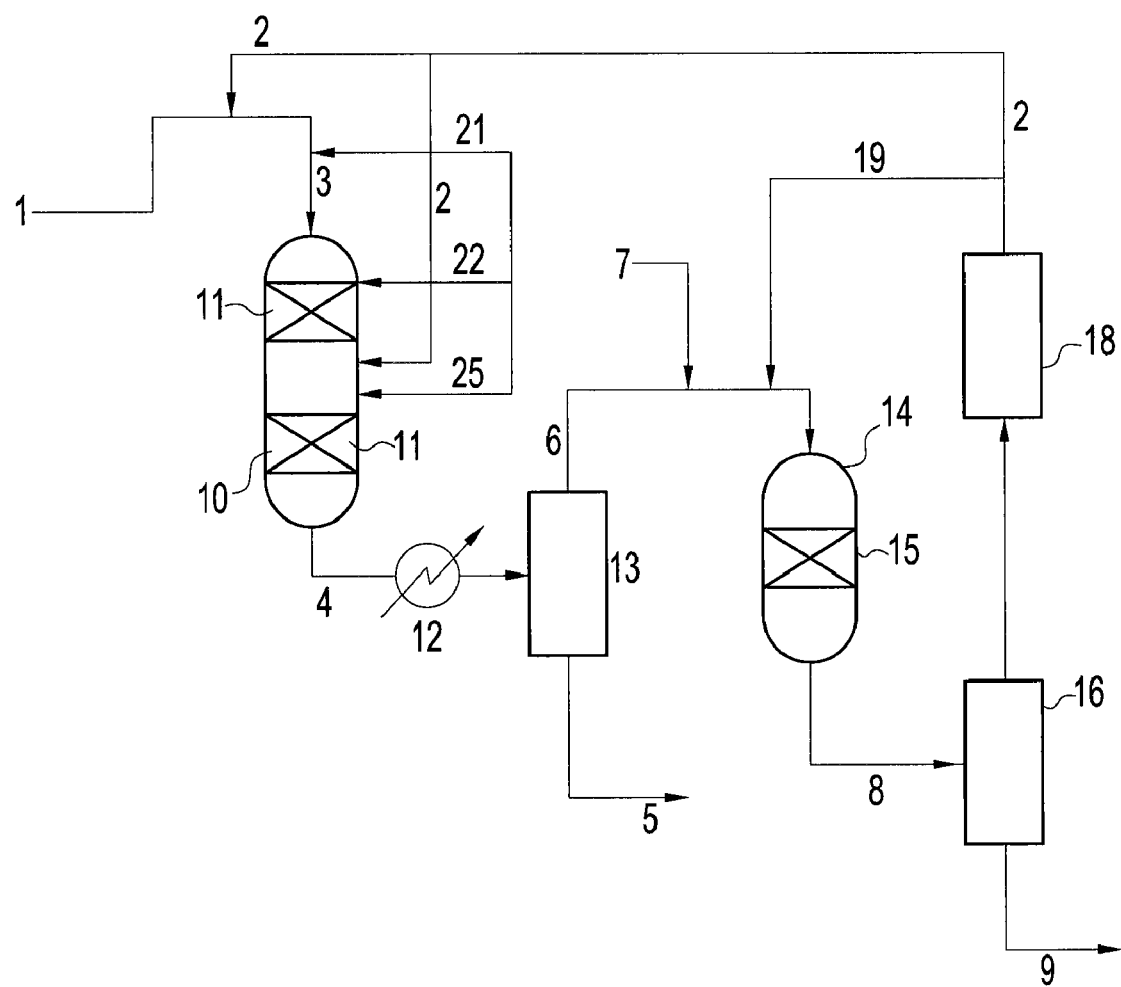

HYDROTREATMENT PROCESS

BACKGROUND OF THE INVENTION

The present invention relates to a process for the hydrotreating of fuels with co-production of hydrogen during operation of the process. More particularly the invention relates to a hydrotreating process in which the hydrocarbon fuel contains renewable organic material which generates carbon monoxide during operation of the process. The carbon monoxide is then converted to hydrogen in the recycle loop by a water gas shift stage.

During the refining of oil feeds, hydrotreatment stages are utilized for the removal of impurities such as sulphur and nitrogen. Hydrocarbon feedstocks and in particular heavy hydrocarbons such as oil and diesel usually contain organic sulphur and nitrogen compounds that in subsequent stages represent undesired impurities because of their negative effect on catalyst activity. Additionally, environmental regulations impose a demand on the production of extremely clean transportation fuels with very low sulphur levels, for instance as low as 10 ppm total sulphur in diesel fuels. The sulphur and nitrogen impurities are therefore hydrogenated during hydrotreatment to hydrogen sulphide and ammonia prior to being treated in a subsequent hydroprocessing stage, where depending on the hydrocarbon feedstock used its value may be increased by rearranging the molecules, for instance by hydrocracking.

The hydrogen needed in the hydrotreatment process is normally provided internally in the process by mixing the hydrocarbon fuel with hydrogen-rich recycle gas produced in the process. Additional hydrogen may be supplied from an external source in the form of a make-up gas which can be combined with the hydrogen-rich recycle gas produced in the hydrotreatment process. The make-up hydrogen is used to compensate for the hydrogen consumed during the hydrotreatment. After passing the hydrotreatment stage by contact with one or more fixed beds of e.g. hydrodesulfurisation (HDS) or hydrodenitrogenation (HDN) catalysts, the hydrocarbon feedstock, for instance an oil feed or diesel being depleted from sulphur and nitrogen, is conducted to a hot separator wherefrom an overhead fraction and a bottom fraction is withdrawn. The overhead fraction is then cooled and mixed with water prior to entering a cold separator, where an overhead fraction in the form of a hydrogen-rich gaseous stream is withdrawn. This hydrogen-rich stream is then recycled to the hydrotreatment stage, while the bottoms fraction containing the cleaned fuel is withdrawn and ready for use, for instance as transportation fuel.

US-A-2002/004533 describes a process for the integration of shift reactors and hydrotreaters, in which the hydrogen-rich recycle stream from the hydrotreating process is combined with hydrogen produced from the water gas shift of a synthesis gas produced in a separate process.

U.S. Pat. No. 3,694,344 describes a process in which part of the hydrogen used in the hydrotreatment stage is obtained from a separate process for the production of hydrogen comprising the reforming of natural gas to produce synthesis gas with subsequent water gas shift for further conversion into a hydrogen-rich gas.

U.S. Pat. No. 3,413,214 discloses a process for the hydrogenation of liquid hydrocarbons in which oxygen gas is added to the liquid hydrocarbon in order to induce the generation of a gas product from the hydrotreatment step that contains carbon monoxide. The gas product is subsequently depleted from hydrogen sulphide and then subjected to water gas shift to convert the carbon monoxide in the gas to hydrogen. The resulting hydrogen-rich stream from the water gas shift is recycled to the hydrotreatment stage. The production of this additional hydrogen reduces the requirement of hydrogen from external sources, for instance as make-up hydrogen.

SUMMARY OF THE INVENTION

We have now found that by hydrotreating a hydrocarbon fuel of which a portion consists of renewable organic material it is possible to in-situ produce carbon monoxide in the gas, i.e. during operation of the process, thereby enabling a simpler and not least safer production of additional hydrogen compared to prior art processes. A highly attractive alternative fuel in the form of a renewable organic material may thus be used without resorting to highly hazardous solutions such as injection of oxygen from an external source, which additionally requires dedicated and highly expensive separate plants for its preparation, or separate and highly expensive plants for the provision of additional hydrogen such as reforming plants for the production of synthesis gas containing carbon monoxide and hydrogen.

Accordingly we provide a process for the hydrotreating of a hydrocarbon fuel comprising the steps:
(a) forming a feedstock by combining a hydrocarbon fuel containing renewable organic material with a hydrogen stream;
(b) conducting the feedstock of step (a) to a hydrotreating stage by contacting said feedstock with at least one fixed bed of hydrotreating catalyst;
(c) passing the effluent from the at least one of the catalyst fixed beds of step (b) to a hot separator and withdrawing from the hot separator an overhead fraction and a bottoms fraction;
(d) passing the overhead fraction of step (c) to a water gas shift stage;
(e) passing the effluent from step (d) to a cold separator and withdrawing from the cold separator a gaseous overhead fraction in the form of a hydrogen-rich recycle gas stream;
(f) passing the gaseous overhead fraction of step (e) to a hydrogen sulphide recovery unit in which a solvent is contacted with said gaseous stream and withdrawing from said recovery unit a gaseous stream with reduced content of hydrogen sulphide and carbon dioxide, and withdrawing from said recovery unit a solvent containing hydrogen sulphide and carbon dioxide;
(g) returning the gaseous stream with reduced content of hydrogen sulphide and carbon dioxide of step (f) to step (a), or
returning a portion of the gaseous stream with reduced content of hydrogen sulphide and carbon dioxide of step (f) to step (a) by dividing said gaseous stream into at least two streams and returning at least one of these streams to step (a) and at least one of these streams to step (d).

Preferably, step (g) comprises dividing said gaseous stream into two streams and returning one of these streams to step (a) and one of these streams to step (d).

As used herein the term "renewable organic material" defines vegetable oils, animal fats, tall oil, and derived material such as fatty acid alkyl esters, particularly fatty acid methyl esters (FAME)—also known as biodiesel—, or combinations thereof. All of these represent renewable sources. Vegetable oils include rapeseed, soybean, corn, coconut, palm and cotton oils. Animal fats include bacon grease, yellow grease, lard, butter and tallow.

As used herein the terms "hot separator" and "cold separator" define conventional fractionation units.

By treating a hydrocarbon fuel containing renewable organic material according to the process of the invention it is possible to convert in-situ produced carbon monoxide and water to $CO_2$ and $H_2$, thereby enabling removal of the generated CO and $H_2O$ that otherwise can inhibit catalyst activity in the hydrotreating unit and limit its capacity also because of operational restraints on allowed concentrations of impurities in the recycle gas stream. A highly attractive alternative fuel in the form of a diesel fully or partly based on renewable sources may thus be produced without being forced to limit the throughput or resorting to very high purge rates that are otherwise necessary to limit the content of contaminants such as carbon monoxide and which furthermore has a very low affinity for removal in the hydrogen sulphide recovery unit, such as an amine wash unit.

The hydrogen stream of step (a) is a hydrogen-recycle gas stream, a hydrogen make-up gas or a combination of both.

In one embodiment of the invention, the content of renewable organic material in the hydrocarbon fuel is at least 5 vol %, preferably at least 20 vol %, more preferably at least 50 vol %. The other component in the hydrocarbon fuel may be a conventional fossil petroleum diesel. At levels above 5 vol % of renewable organic material in the hydrocarbon fuel, the carbon monoxide produced reaches a level which makes the provision of a water gas shift stage expedient. Most preferably the hydrocarbon fuel contains at least 75 vol % renewable organic material, in particular at least 75 vol % biodiesel.

The term "hydrotreatment" encompasses a range of process requiring the presence of hydrogen, namely hydrogenation, hydrocracking, hydrodearomatisation (HDA), hydrodesulfurisation (HDS) and hydrodenitrification (HDN). In this invention the hydrotreating step is preferably a hydrodesulfurisation (HDS) and/or a hydrodenitrogenation (HDN) step.

Hydrotreating conditions involve normally operation at temperatures between 200 and 500° C. and pressures up to 200 bar. Catalysts used in the hydrotreating step are preferably those employed conventionally, such as mixed cobalt and/or nickel and molybdenum sulfides supported on alumina and mixed nickel and tungsten sulfides supported on alumina or silica. Other suitable catalysts include those containing ruthenium sulfide and catalysts using novel supports such as silica-aluminas, carbons or other materials.

During the hydrotreatment stage the renewable organic material reacts with hydrogen to form a mixture of hydrocarbons boiling in the diesel range, carbon monoxide, carbon dioxide, water, methane and propane. Since the gas phase contains valuable unreacted hydrogen, it is usually recycled to the hydrotreament stage after cleaning. Conventionally, gas-cleaning stages include gas scrubbing by amine wash units that remove $CO_2$ and $H_2S$ but which have a low affinity for removal of CO. Therefore, carbon monoxide builds up in the recycle gas loop unless a significant amount of purge gas is drawn and sent for flaring or use in another process unit. If the CO level in the recycle gas becomes too high, catalyst activity in the hydrotreater is deteriorated and the hydrogen partial pressure is lowered. This conveys also the problem that the amount of renewable organic material in the hydrocarbon fuel has to be kept as low as 5 vol %. As the purge gas contains high amounts of hydrogen, a higher purge means that a higher flow of expensive high-purity make-up hydrogen is also required.

By the invention it is possible to operate the hydrotreater with a high content of renewable organic material and at the same time it is possible to obtain an elevated content of hydrogen in the hydrogen-rich recycle stream, thereby also reducing the need of addition of highly expensive hydrogen through external sources.

The effluent from the hydrotreating stage is passed to a hot separator (fractionation unit), where the gaseous products are withdrawn as the light overhead fraction. Small amounts of hydrogen sulphide may still be present in this stream which is poisonous for conventional water gas shift catalysts, where carbon monoxide reacts reversibly with water to produce hydrogen and carbon dioxide. Therefore it is preferred that the water gas shift stage is a sour-shift stage comprising sulphur resistant catalysts such as cobalt-molybdenum catalysts.

Alternatively, the gaseous overhead fraction from the hot separator may be scrubbed to remove hydrogen sulphide prior to passing it through a conventional water gas shift stage. Therefore the invention further comprises passing the gaseous overhead fraction of step (c) to a hydrogen sulphide recovery unit in which a solvent is contacted with said gaseous stream and withdrawing from said recovery unit a gaseous stream with reduced content of hydrogen sulphide and carbon dioxide, and withdrawing from said recovery unit a solvent containing hydrogen sulphide and carbon dioxide. The gaseous stream is then conducted to the water gas shift stage. As used herein the solvent is a substance with affinity for hydrogen sulphide, such as amine.

The water gas shift stage is selected from the group consisting of lower water gas shift, medium water gas shift, high water gas shift, and combinations thereof. To take advantage of the exothermicity of the shift reaction $CO+H_2O=H_2+CO_2$, where hydrogen production is favoured at low temperatures but the reaction rate is on the other hand slow, high and low temperature shift may be carried out in series. In a particular embodiment, where hydrogen sulphide has been removed from the gas, the water gas shift is a high temperature water gas shift conducted at 350-500° C. with e.g. iron-copper based catalysts.

In order to ensure at least stoichiometric amounts of carbon monoxide and water during the shift stage, steam may be added to the gas stream (overhead fraction from hot separator of step (c)) or said gaseous stream with reduced content of hydrogen sulphide and carbon dioxide prior to conducting said shift stage. In this manner, all the carbon monoxide present in the gas is used in the shift reaction for hydrogen production, as the reaction is encouraged to proceed towards the hydrogen side.

Subsequent to the water gas shift stage the hydrogen enriched gas, after cooling and mixing with water, is passed to a cold separator (fractionation unit). From this unit a gaseous overhead fraction in the form of a hydrogen-rich recycle stream is withdrawn, together with a bottoms fraction in the form of a hydrocarbon liquid stream containing the sulphur-free biodiesel, and optionally also a sour water stream containing e.g. ammonium bisulfate caused by the removal of some of the ammonia and hydrogen sulphide.

Preferably the gaseous overhead fraction from the cold separator is scrubbed in a washing unit in which the solvent is an amine. The thus obtained gaseous effluent stream with a reduced content of hydrogen sulfide and carbon dioxide may be partially recycled to the water gas-shift converter in order to convert any remaining carbon monoxide to carbon dioxide or it can be fully returned to the hydrotreating stage. Therefore, a portion of the gaseous stream with reduced content of hydrogen sulphide and carbon dioxide of step (f) is returned to step (d) (water gas shift stage) by dividing said gaseous stream into at least two streams and returning at least one of these streams to the hydrotreating stage and at least one of these streams to the water gas shift stage.

The gaseous stream from the amine wash unit, now representing a purified gas effluent is used as hydrogen recycle stream for hydrotreatment reactor and optionally as quench gas in between the catalytic beds of said reactor.

The addition of water to hydrotreating units under conventional hydrotreating conditions is unwanted. It is known that the catalytic activity of hydrotreating catalysts is related to the presence of sulfides of Group VI-B and VIII such as Co, Mo, Ni, W, in particular mixtures of Co—Mo, Ni—Mo and Ni—W supported on alumina, silica, titania, zeolite Y or combinations thereof. If the catalyst is not completely sulphided its activity decreases drastically. The presence of water is thus normally avoided in hydrotreating due to the risk of the sulfidic catalysts turning back to their oxidised condition with attendant loss of catalytic activity.

We have also found that conventional hydrotreating catalysts are able to establish near thermodynamic equilibrium for the water-gas-shift reaction in the hydrotreating stage and yet by the addition of water to the hydrotreating stage the equilibrium of the water-gas shift reaction is shifted even more towards carbon dioxide and hydrogen without affecting the hydrodesulfurisation or hydrodenitrification capacity of the catalyst.

Accordingly, in yet another embodiment of the invention water in an amount of 0.1 to 10 wt % of said hydrocarbon fuel is added to the feedstock of step (a), and/or to the one or more fixed beds of hydrotreating catalyst of step (b).

The amount of water added to the hydrotreating stage depends on the content of renewable organic material in the hydrocarbon fuel. The higher the content of renewable organic material, the higher the amount of water added. For a hydrocarbon fuel containing up to about 20 vol % renewable organic material, the amount of water added is preferably in the range 1 to 8 wt % of the hydrocarbon fuel, more preferably in the range 2 to 4 wt %. For a hydrocarbon fuel containing 100% renewable organic material, the amount of water added can be as high as 10 wt %.

Without water addition the in-situ formed carbon monoxide is at least partly converted to methane under consumption of valuable hydrogen. By adding water to the hydrotreating stage methane formation is depressed and the thus associated consumption of valuable hydrogen is reduced. In addition, it is possible to obtain a lower $CO/CO_2$ ratio and as a result there is less risk of catalyst poisoning by the presence of carbon monoxide in the hydrotreater. Water may also be added directly to the one or more fixed beds of hydrotreating catalyst.

Moreover, by the simple addition of water the amount of renewable organic material, preferably biodiesel in the hydrocarbon fuel passed to the hydrotreating stage can be increased significantly, for instance from about 5 vol % renewable organic material to 10 vol % or 20 vol % or even more, for instance 30 vol % or even 100 vol % biodiesel. Only up to levels of about 5 vol % renewable organic material in the feedstock it is possible to operate the hydrotreating process without shift and/or water addition. The other component in the hydrocarbon fuel may be a conventional oil fraction such as light gas oil, light cycle oil, coker gas oil or vacuum gas oil (VGO).

In yet another embodiment of the invention, water is added the feedstock and also to the one or more fixed beds of hydrotreating catalyst.

BRIEF DESCRIPTION OF THE DRAWING

The sole FIGURE shows a simplified diagram of a process according to a specific embodiment of the invention comprising a hydrotreating stage, associated hydrogen recycle loop, shift stage and water addition.

DETAILED DESCRIPTION OF THE PREFERRED EMBODIMENTS

Feedstock stream 1 containing renewable organic material is preheated (not shown) and introduced to the hydrotreating reactor 10 after being mixed with hydrogen recycle stream 2 to form stream 3. Stream 3 is further heated (not shown) and sent to the at least one catalytic bed 11 of the hydrotreating reactor 10. An effluent 4 containing product diesel, hydrogen sulphide, ammonia, carbon dioxide, carbon monoxide, water and other light hydrocarbons is withdrawn from reactor 10 and then cooled via heat exchanger 12 by steam production or feed preheating. The cooled effluent is then conducted to hot separator (fractionation unit) 13 where a bottoms fraction 5 is withdrawn while the lighter components containing carbon monoxide, carbon dioxide, hydrogen sulphide, ammonia, water, and other light hydrocarbons are recovered as overhead fraction 6. This overhead fraction is sent to hydrogen recovery by passage through sour water gas shift converter 14 having a fixed bed of sour shift catalyst 15 arranged therein. Stream 7 is added upstream the sour shift stage to ensure complete reaction of carbon monoxide to hydrogen. The effluent 8 from the shift converter is cooled by steam generation or process exchange (not shown) and conducted to a cold separator (fractionation unit) 16. From the cold separator a hydrogen-rich overhead fraction is withdrawn and passed to an amine wash unit 18. The purified gas effluent 2 from the amine wash unit 18 is partially used as hydrogen recycle stream for hydrotreatment reactor 10, and optionally as quench gas in between catalytic beds 11. A portion of stream 2 is recycled as stream 19 to the water gas shift converter 14 to ensure complete removal of carbon monoxide. Water is added as stream 21 to the hydrocarbon feedstock 3 and as stream 22, 23 to the one or more fixed beds of hydrotreating catalyst 11. A bottoms fraction 9 is then withdrawn from the cold separator 16 containing product diesel for further use as clean renewable transportation fuel.

Example 1

Feedstock A (Table 1) is a mixture of 20% by volume of rapeseed oil and 80% by volume vacuum gas oil. The pure vacuum gas oil is denoted Feedstock B. Feedstock A was hydrotreated in a once-through pilot plant using 105 ml of a hydrotreating catalyst (Ni and Mo impregnated on an alumina support). The flow of feedstock A was 105 ml/hr corresponding to a LHSV of 1 $hr^{-1}$. 100% hydrogen (no recycle) at a pressure of 80 bar was co-fed with the liquid stream at a rate of 73.5 Nl/hr corresponding to a $H_2$/oil ratio of 700 Nl/l. The temperature of the reactor was maintained at 350° C. Product samples were taken of the liquid effluent. The exiting gas from the reactor was analyzed by gas chromatography.

TABLE 1

Properties of feedstock A and B used in the following examples

| Property | Feedstock A | Feedstock B |
|---|---|---|
| S.G. | 0.9139 | 0.9123 |
| S (wt %) | 2.23 | 2.88 |
| N (wt ppm) | 494 | 737 |
| H (wt %) | 12.0 | 12.2 |
| Simulated Distillation (° C.) | | |

TABLE 1-continued

Properties of feedstock A and B used in the following examples

| Property | Feedstock A | Feedstock B |
|---|---|---|
| 5 wt % | 362.4 | 363.6 |
| 10 wt % | 376.6 | 376.4 |
| 30 wt % | 404.0 | 401.2 |
| 50 wt % | 422.2 | 416.4 |
| 70 wt % | 442.0 | 430.8 |
| 90 wt % | 606.2 | 450.2 |
| 95 wt % | 622.0 | 460.2 |

Based on the flows of oil and hydrogen, liquid product analyses and the exit gas composition, Table 2 was constructed showing the yields (expressed as (g product/g liquid feed)×100%), and the volume-based gas composition.

TABLE 2

| Property | Products from Feedstock A |
|---|---|
| Liquid Product Analyses | |
| H (wt %) | 13.5 |
| S.G. | 0.860 |
| Yields (wt % Fresh Feed) | |
| CO | 0.39 |
| $CO_2$ | 0.41 |
| $H_2O$ | 1.79 |
| $CH_4$ | 0.20 |
| $C_2H_6$ | 0.05 |
| $C_3H_8$ | 0.96 |
| $i-C_4 + n-C_4$ | 0.07 |
| $H_2S + NH_3$ | 2.36 |
| Liquid Product (C5+) | 95.24 |
| $H_2$ Consumption (Nl/l) | 148 |
| Exit Gas Composition (vol %) | |
| CO | 0.48 |
| $CO_2$ | 0.32 |
| $H_2O$ | 3.49 |
| $CH_4$ | 0.43 |
| $H_2$ | 91.93 |
| Other Hydrocarbons + $H_2S + NH_3$ | 3.36 |
| $(y_{CO2} y_{H2})/(y_{CO} y_{H2O})$ | 17.6 |

As can be observed from Table 2, the main differences when processing feedstock B compared to processing a pure hydrocarbon feedstock that contains no or only trace amounts of oxygen, are the emergence of CO, $CO_2$ and $H_2O$, as well as increased yields of $CH_4$ and $C_3H_8$ in the gas-phase product. The increase in $C_3H_8$ yield is within experimental uncertainty consistent with complete conversion of the triglycerides in the rapeseed oil. The measured HDS conversion in both this and the following examples was approximately 96-97%.

This example shows that considerable amounts of CO, $CO_2$ and $H_2O$ are formed when processing a feedstock containing oxygen such as vegetable oils and/or animal fats. Furthermore the high yield of $CH_4$ indicates that the formed CO is partly converted to $CH_4$, thereby consuming valuable hydrogen.

The equilibrium constant $K_P$ for the water-gas shift reaction may for an ideal gas mixture be written as $$K_P = (y_{CO2} y_{H2})/(y_{CO} y_{H2O}),$$

where $y_X$ denotes the volumetric gas-phase concentration of compound X (X=$CO_2$, $H_2$, $CO_2$, $H_2O$). At 350° C. the theoretical value of $K_P$ is 20.7. From the experimental data, a value of 17.6 is calculated, very close to the theoretical equilibrium value. This example therefore also shows that a hydrotreating catalyst is effective in establishing thermodynamic equilibrium for the water-gas shift reaction.

Example 2

Feedstock A from Example 1 is processed using the same catalyst and conditions (temperature=350° C., pressure=80 barg, LHSV=1 hr$^{-1}$, $H_2$/oil=700 Nl/l) as in Example 1, however $H_2O$ was added to the feed before it entered the reactor. Two experiments with 2.1 g $H_2O$/hr and 4.2 g $H_2O$/hr, respectively, were conducted. These water flows correspond to 2.0 vol % and 4.0 vol % of the mass-flow of feedstock A. The results are shown in Table 3, yields are calculated based on the flow of fresh feedstock (excluding $H_2O$).

TABLE 3

Properties of products in Example 2

| Property | Product from Feedstock A. 2.1 g $H_2O$/hr added upstream reactor | Product from Feedstock A. 4.2 g $H_2O$/hr added upstream reactor |
|---|---|---|
| Liquid Product Analyses | | |
| H (wt %) | 13.4 | 13.4 |
| S.G. | 0.861 | 0.862 |
| Yields (wt % Fresh HC Feed) | | |
| CO | 0.31 | 0.25 |
| $CO_2$ | 0.63 | 0.82 |
| $H_2O$ | 3.79 | 5.82 |
| $CH_4$ | 0.14 | 0.13 |
| $C_2H_6$ | 0.05 | 0.05 |
| $C_3H_8$ | 0.89 | 0.85 |
| $i-C_4 + n-C_4$ | 0.05 | 0.05 |
| $H_2S + NH_3$ | 2.36 | 2.36 |
| Liquid Product | 95.30 | 95.34 |
| $H_2$ Consumption (Nl/l) | 141 | 140 |
| Exit Gas Composition (vol %) | | |
| CO | 0.37 | 0.29 |
| $CO_2$ | 0.48 | 0.60 |
| $H_2O$ | 7.05 | 10.39 |
| $CH_4$ | 0.29 | 0.26 |
| $H_2$ | 88.67 | 85.48 |
| Other Hydrocarbons + $H_2S + NH_3$ | 3.14 | 2.98 |
| $(y_{CO2} y_{H2})/(y_{CO} y_{H2O})$ | 16.3 | 16.9 |

In these tests, the conversion of sulfur and nitrogen was similar to that observed in Example 1. The total molar yield of CO, $CO_2$ and $CH_4$ in Example 1 and Example 2 is within 5% constant for all experiments with feedstock A, with or without water injection. This demonstrates that the CO and $CO_2$ formed from decarboxylation of rapeseed oil will only react to $CH_4$ and not to any other compounds. When $H_2O$ is injected the yield of $CH_4$ decreases, meaning that less CO and $CO_2$ is transformed into $CH_4$. The formation of $CH_4$ and the associated hydrogen consumption is unattractive and this example shows that it can be suppressed by the injection of $H_2O$.

Additionally, the injection of $H_2O$ also shifts the equilibrium of the water-gas shift reaction towards $CO_2$ and $H_2$. As can be seen from Table 3, the observed values of $K_P$ for the water-gas shift reaction (16.3 and 16.9) are close to the thermodynamic equilibrium value (20.7) and to the value observed in Example 1 (17.6), meaning that the catalyst is still effective in establishing equilibrium in the water-gas shift reaction, also in the case where $H_2O$ is added to the feed. Consequently, the CO/$CO_2$ molar ratio decreases from 1.5 when no $H_2O$ is added (Example 1), to 0.77 (2.1 g $H_2O$/hr added) and 0.49 (4.2 g $H_2O$/hr added). Furthermore, the absolute level of CO in the exit gas decreases from 0.48 vol to 0.37 vol % (2.1 g $H_2O$/hr added) and 0.29 volt (4.2 g $H_2O$/hr added). When the effluent gas is recycled to the entry of the reactor, CO and $CO_2$ will build up in the recycle gas loop if measures to prevent this are not taken. As CO and $CO_2$ may inhibit the catalyst activity, it is advantageous to remove the $CO_2$ from the treat gas e.g. by an amine wash step. The amine wash does not remove CO, but this example demonstrates that by injection of $H_2O$, lower CO levels in the treat gas can be achieved without additional hydrogen consumption.

When higher amounts of $H_2O$ are present in the reactor, the water-gas shift reaction is shifted towards $CO_2$ and $H_2$. Additionally the methanation of CO to $CH_4$ is suppressed. These effects lead to lower hydrogen consumption (141 and 140 Nl/l) when $H_2O$ is injected compared to example 1 where feedstock A is processed in the absence of $H_2O$ ($H_2$ consumption 148 Nl/l). The present examples thus demonstrate that by injection of $H_2O$ the overall hydrogen consumption can be lowered.

What is claimed is:

1. A process for the hydrotreating of a hydrocarbon fuel comprising the steps:
   (a) forming a feedstock by combining a hydrocarbon fuel containing renewable organic material with a hydrogen stream;
   (b) conducting the feedstock of step (a) to a hydrotreating stage by contacting said feedstock with at least one fixed bed of hydrotreating catalyst;
   (c) passing the effluent from the at least one fixed bed of hydrotreating catalyst of step (b) to a hot separator and withdrawing from the hot separator an overhead fraction and a bottoms fraction;
   (d) passing the overhead fraction of step (c) to a catalytic water gas shift stage;
   (e) passing an effluent from step (d) to a cold separator and withdrawing from the cold separator a gaseous overhead fraction in the form of a hydrogen-rich recycle gas stream;
   (f) passing the gaseous overhead fraction of step (e) to a hydrogen sulphide recovery unit in which a solvent is contacted with said gaseous stream and withdrawing from said recovery unit a gaseous stream with reduced content of hydrogen sulphide and carbon dioxide, and withdrawing from said recovery unit a solvent containing hydrogen sulphide and carbon dioxide;
   (g) returning the gaseous stream with reduced content of hydrogen sulphide and carbon dioxide of step (f) to step (a),
   or
   returning a portion of the gaseous stream with reduced content of hydrogen sulphide and carbon dioxide of step (f) to step (a) by dividing said gaseous stream into at least two streams and returning at least one of these streams to step (a) and at least one of these streams to step (d).

2. Process according to claim 1, wherein the hydrogen stream of step (a) is a hydrogen-recycle gas stream, a hydrogen make-up gas or a combination of both.

3. Process according to claim 1, wherein the content of renewable organic material in the hydrocarbon fuel is at least 5 vol %.

4. Process according to claim 1, wherein the hydrotreating step is a hydrodesulfurisation (HDS) and/or a hydrodenitrogenation (HDN) step.

5. Process according to claim 1, wherein the water gas shift stage is a sour-shift stage.

6. Process according to claim 1, further comprising passing the gaseous overhead fraction of step (c) to a hydrogen sulphide recovery unit in which a solvent is contacted with said gaseous stream and withdrawing from said recovery unit a gaseous stream with reduced content of hydrogen sulphide and carbon dioxide, and withdrawing from said recovery unit a solvent containing hydrogen sulphide and carbon dioxide.

7. Process according to claim 1, wherein the water gas shift stage is selected from the group consisting of lower water gas shift, medium water gas shift, high water gas shift, and combinations thereof.

8. Process according to claim 1, wherein prior to conducting the water gas shift stage, steam is added to said overhead fraction of step (c) or said gaseous stream with reduced content of hydrogen sulphide and carbon dioxide.

9. Process according to claim 1, wherein water in an amount of 0.1 to 10 wt % of said hydrocarbon fuel is added to the feedstock of step (a), and/or to the one or more fixed beds of hydrotreating catalyst of step (b).

* * * * *